Patented June 11, 1946

2,401,802

UNITED STATES PATENT OFFICE 2,401,802

METHOD OF CONVERTING MONO-OLEFINS TO DI-OLEFINS

Hugh S. Taylor and John Turkevich, Princeton, N. J., assignors to The M. W. Kellogg Company, Jersey City, N. J., a corporation of Delaware No Drawing. Application November 6, 1943, Serial No. 509,326

7 Claims. (Cl. 260—680)

This invention relates to the dehydrogenation of mono-olefin hydrocarbons. More particularly the invention relates to the dehydrogenation of mono-olefin hydrocarbons having less than 6 carbon atoms per molecule or, if more than 5 carbon atoms are present, having no more than 5 carbon atoms in the main chain. Still more particularly, the invention relates to the production of di-olefin hydrocarbons by catalytic dehydrogenation of such mono-olefin hydrocarbons.

When mono-olefin hydrocarbons of the character described are subjected to dehydrogenation in the presence of a catalyst the di-olefin hydrocarbons produced comprise principally those containing conjugate double bonds. For example, in the catalytic dehydrogenation of 1-pentene the pentadiene product consists essentially of 1,3-pentadiene with at most minor amounts of 1,2-pentadiene and 1,4-pentadiene. Similarly in the dehydrogenation of butenes, the principal product is 1,3-butadiene. The invention, therefore, is directed primarily to the production of di-olefins containing conjugate double bonds since these are the principal products of the dehydrogenation of mono-olefins. The production of other di-olefins, such as allene and its homologues and di-olefins in which more than one single bond intervenes between the double bonds, is not, however, otherwise excluded from the scope of the invention.

The di-olefins containing conjugate double bonds which are produced in accordance with this invention include 1,3-butadiene (divinyl), 1,3-pentadiene (piperylene), 2-methyl-1,3-butadiene (isoprene), 4-methyl-1,3-pentadiene, 3-methyl-1,3-pentadiene, 2-methyl-1,3-pentadiene, 2-ethyl-1,3-butadiene and 2,3-di-methyl-1,3-butadiene. These are produced by the dehydrogenation treatment of corresponding mono-olefins. The production of di-olefins having conjugate double bonds which are of higher molecular weight than those listed above is within the scope of the invention. The production of such higher molecular weight di-olefins is more difficult and less attractive than processes for producing the ones listed above since it involves the treatment of olefin hydrocarbons of higher molecular weight which are susceptible to undesired side reactions.

Numerous catalysts have been proposed for the dehydrogenation of mono-olefin hydrocarbons to produce di-olefins. These include many of the catalysts which have been found useful in the dehydrogenation of hydrocarbons generally. In the catalytic dehydrogenation of mono-olefins in the presence of such catalysts it is desirable to maintain the pressure as low as possible to avoid polymerization of the di-olefin products. The process ordinarily is carried out at relatively high temperature (500–800° C.), at the low pressure, and in a short contact time, following which the products are cooled immediately to temperatures sufficiently low to inhibit further reaction. To reduce the partial pressure of the olefin reactants it is customary to dilute the charge of the dehydrogenation treatment with a substantial proportion of inert gas such as nitrogen, carbon di-oxide or steam. Of these steam is preferred because of the relative ease with which it can be prepared and handled as compared to the other gases.

At the high temperatures and low pressures employed considerable decomposition of hydrocarbons may occur with resulting accumulation of carbonaceous materials on the catalyst surface. It is necessary, therefore, to treat the catalyst periodically for the removal of such carbonaceous deposits. Conveniently this is effected by passing steam over the catalyst at a temperature substantially equivalent to the reaction temperature to convert the carbon to carbon monoxide, while also forming hydrogen.

The desirability of using steam as the diluent in the dehydrogenating treatment has had the result of excluding from use those catalysts which are known, or thought, to be affected adversely by water or steam. A catalyst consisting primarily of magnesium oxide and comprising minor amounts of copper oxide and iron oxide has come into use principally because it has been shown to be unaffected by the presence of water during the reaction or during the regeneration treatment.

Dehydrogenating catalysts comprising compounds of metals of the left-hand columns of groups IV, V and VI of the periodic table in combination with various supporting materials are highly active in the dehydrogenation of paraffin hydrocarbons. In particular alumina as such, or in combination with a minor proportion of an activating ingredient such as the above-mentioned compounds, also is effective in the dehydrogenation of paraffin hydrocarbons. However, these catalytic materials have not gone into use in the dehydrogenation of mono-olefins to di-olefins because of the desirability of using steam as a diluent during the reaction and for regenerating the catalyst. It has been considered by those skilled in the art that such catalysts would be affected adversely by steam.

In reissued Patents Nos. 21,464, 21,465 and 21,588, which relate to dehydrogenation by means of catalysts comprising minor proportions of compounds of metals of the left-hand columns of groups IV, V and VI of the periodic table in combination with various supporting materials, including alumina, it is stated that:

"It is an important feature of the present process that the vapors undergoing dehydrogenation should be free from all but traces of water vapor since the presence of any substantial amounts of steam reduces the catalytic selectivity of the composite catalyst to a marked degree."

This statement occurs also in Reissued Patents Nos. 21,466, 21,467 and 21,486 which relate to dehydrogenation by means of a catalyst comprising a major proportion of alumina and a minor proportion of a compound of one of the metals of the left-hand columns of groups IV, V and VI of the periodic table. In all of these patents it is suggested that the action of the steam may be to cause a partial dehydrogenation of such basic carriers as alumina and magnesium oxide and some of the active catalytic compounds due to preferential adsorption.

In Patent No. 2,131,089, which relates to dehydrogenation of aliphatic hydrocarbons, including the conversion of mono-olefins to di-olefins, it is stated that the activity of dehydrogenating catalysts in general may be maintained somewhat by the incorporation of small regulated quantities of water vapor in the hydrocarbon reactants. However, the amounts of water vapor employed by these patentees were regulated to the order of magnitude of about 1% or less of the volume of the hydrocarbon reactants since, they state, for each catalyst there is a definite critical concentration of water vapor above which inferior results are obtained.

In Patents Nos. 2,182,431, 2,184,235 and 2,198,195, which relate to dehydrogenation in the presence of catalysts consisting of or including "activated alumina," the presence of water vapor in amounts sufficiently great to effect dilution of the hydrocarbon reactants is stated to have a deleterious effect on the activity of the catalyst. For example in Patent No. 2,184,235 it is stated that:

"An Activated Alumina catalyst is quite sensitive to the presence of water vapor in the treated material. Concentrations of water vapor up to about 0.01% by volume in the feed appear to be essential to practicable activity of an activated alumina catalyst, but addition water has a deleterious effect and decreases its activity."

The presence of water vapor in the dehydrogenation of hydrocarbons by means of catalyst comprising molybdenum oxide or chromium oxide in combination with alumina is stated to be deleterious to the activity of the catalyst in Patents Nos. 2,167,650, 2,184,234 and 2,184,280.

The above teachings of the literature relating to hydrocarbon dehydrogenation in general are applied specifically to the conversion of mono-olefins to di-olefins in Patents Nos. 2,178,584, 2,178,601 and 2,178,602. These patents relate to the dehydrogenation of mono-olefins to di-olefins in the presence of catalysts comprising an oxide of a metal of the left-hand columns of groups IV, V and VI of the periodic table, such oxides being employed preferably in combination with supporting materials comprising certain refractory oxides and silicates which in themselves catalyze reactions of mono-olefins at the temperatures employed for the production of di-olefins. The supporting materials listed in these patents are magnesium oxide, aluminum oxide, bauxite, bentonite, greensand, montmorillonite, kieselguhr, silica and fire brick. In these patents it is stated that:

"It has been found essential to the efficient and selective dehydrogenation of mono-olefinic hydrocarbons when using the present types of catalysts that the gaseous or vaporized materials be substantially free from water vapor. If appreciable amounts of steam are present the catalytic activity is adversely affected so that the active life is shortened, the need for regeneration becomes more frequent and a point is more quickly reached where regeneration is no longer effective."

All of the patents mentioned above, as well as others relating to catalytic dehydrogenation of hydrocarbons, teach that the use of alumina as a supporting material or as a catalyst is restricted to alumina of the form prepared by controlled dehydration of aluminum hydrates. It is preferred evidently that the alumina should either be dehydrated incompletely or dehydrated completely under controlled temperature conditions whereby gamma $Al_2O_3$ is the product. $Al_2O_3$ in the alpha, or corundum form, is indicated as not suitable as a catalyst or as a base material in dehydrogenation of hydrocarbons. For example in the last three patents mentioned, which relates specifically to the dehydrogenation of mono-olefins to di-olefins, it is stated that "Alumina in the form of powdered corundum is not suitable as a base."

We have discovered that catalysts comprising as the essential active ingredient an oxide of a metal of the left-hand columns of groups IV, V and VI of the periodic table may be employed in the dehydrogenation of mono-olefin hydrocarbons to di-olefin hydrocarbons in the presence of a steam diluent without adversely affecting the activity of the catalyst. We have discovered further that alumina may be employed in combination with such catalysts as the supporting material and in the presence of a steam diluent without adverse affect. We have discovered furthermore that steam may be employed to regenerate such catalysts without deleterious effect on the activity of the catalyst. We have discovered furthermore that forms of alumina which have been considered heretofore to be inferior or useless as supporting materials in the dehydrogenation of mono-olefin hydrocarbons may be employed in combination with activating ingredients, particularly chromium oxide, to effect the dehydrogenation of mono-olefin hydrocarbons to di-olefins, with or without a diluent, at a rate equal to that obtained with catalysts including as the base material alumina of the forms previously preferred, such as "activated alumina". We have discovered furthermore that catalysts of the character of chromium oxide are effective in the conversion of mono-olefins to di-olefins when employed in minor proportions in combination with supporting materials which are completely inert toward the hydrocarbon reactants at the temperatures necessary to effect substantial conversion of mono-olefins to diolefins.

For example we have discovered that a catalyst consisting of a major proportion of "activated alumina" and a minor proportion of chromium oxide may be employed to convert mono-olefins to di-olefins in the presence of a steam diluent at a rate equal to the rate of conversion achieved with a similar catalyst in the presence of an inert diluent. We have further discovered that a catalyst consisting of a major proportion of alpha Al₂O₃, such as "Alfrax," and a minor proportion of chromium oxide is as active in the dehydrogenation of mono-olefins to di-olefins as similar catalysts employing as the base material "activated alumina" or other partially dehydrated aluminum hydrate, regardless of the presence or absence of the diluent or whether the diluent employed is steam or nitrogen or other inert gas. We have discovered furthermore that a catalyst comprising a minor proportion of chromium oxide in combination with a base material comprising unglazed porcelain tile is a highly effective catalyst for the dehydrogenation of mono-olefins to di-olefins.

A group of active catalysts which we may employ in our improved process comprises in general mixtures of a major proportion of alumina with a minor proportion of chromium oxide. The proportion of chromium oxide in the mixtures may vary within the range of 0.5 to 25 weight per cent of the total alumina and chromium oxide present. Ordinarily mixtures of about 90% alumina and 10% of chromium oxide are satisfactory for the purpose.

The chromium oxide-alumina catalysts may be formed by various methods. The mixture may be formed by impregnating the alumina with an aqueous solution of a chromium compound which is convertible to chromium sesquioxide by the application of heat or by the use of suitable reagents. For example, granular alumina may be impregnated with an aqueous solution of a chromium compound such as ammonium dichromate, chromium nitrate or chromium trioxide. After drying, the impregnated alumina is heated, for example to 500° C., to decompose the chromium compound to chromium sesquioxide. In another method of preparation the alumina is suspended in a solution of a chromium salt and a suitable precipitate, such as ammonium hydroxide, is added to effect precipitation of hydrous chromium oxide. The resulting mixture is then dried to the catalyst form. In a still further method of making the catalyst the alumina is mixed directly with the chromium oxide, the latter being preferably in the form of a gel in the hydrous state. The resulting mixture is then heated to dry the gel. In accordance with a further method of preparation the alumina and chromium oxide may be precipitated in an aqueous solution in the desired proportions. For example, a solution of aluminum nitrate and chromium nitrate may be treated with ammonium hydroxide to effect simultaneous precipitation of the oxides. The resulting precipitate is then dried to form the catalyst.

When alumina as such is employed in the preparation of the chromium oxide-alumina catalyst it may be brought into combination with the chromium oxide while in the form of granules of the size desired in the final catalyst. Alternatively it may be employed in a granular size smaller than that desired in the final catalyst, in which case the chromium oxide-alumina combination is pelleted by any suitable means during or after preparation. For example, a mixture of finely divided alumina and a hydrous chromium oxide jelly may be pelleted, or extruded, prior to drying.

The alumina may be employed in the form of a partially dehydrated aluminum hydrate. Such hydrates include alpha Al₂O₃.H₂O (diaspore), gamma Al₂O₃.H₂O (bohmite), gamma Al₂O₃.3H₂O (gibbsite) and beta Al₂O₃.3H₂O (bayerite). These and other forms of aluminum hydrate occur in nature and also may be synthesized by known methods. A partially dehydrated synthetic aluminum hydrate, which is manufactured and sold under the trade name "activated alumina," is highly satisfactory for use in this process. Bauxite, which is a mineral mixture including one or more of the aluminum hydrates mentioned above, also may be employed after suitable partial dehydration. Preferably the bauxite is treated suitably, for example with acids, to reduce the iron content thereof.

A second form of alumina, which may be employed in the preparation of the catalyst for this process, is alumina gel which may be precipitated directly or which may be formed by peptizing aluminum hydrate. The alumina gel may be dried to a granular material which is employed as such or the alumina gel in a hydrous condition may be mixed with chromium oxide directly, following which the mixture is heated to dry the alumina gel.

A third form of alumina, which we have found to be highly desirable because of its structural strength and inertness, is completely dehydrated alumina. This includes both alpha Al₂O₃ and gamma Al₂O₃. The latter is formed by careful complete dehydration of the various aluminum hydrates. Since it reverts to the alpha form on heating at temperatures within the range which may be employed in this process it is evident that the alpha form is the more important in the present consideration. Alpha Al₂O₃ is the completely dehydrated aluminum oxide, formed ordinarily by fusion of bauxite, which is marketed under various trade names, such as Alfrax, Aloxite and Alundum. Certain grades of these articles of commerce are more porous than others as a result of variables in the process of manufacture. For purposes of this invention the more porous and less dense variations of alpha Al₂O₃ are to be desired.

The completely dehydrated aluminas, such as Alfrax, differ substantially in structure and surface characteristics from partially dehydrated aluminum hydrates such as "activated alumina". The completely dehydrated alpha alumina, such as Alfrax, has been found to be inferior to the partially dehydrated aluminum hydrates as a major ingredient in catalysts for catalytic dehydration of hydrocarbons other than the mono-olefins. It has been supposed by those skilled in the art that alpha Al₂O₃ would be inferior as a catalyst ingredient in the dehydrogenation of mono-olefins also. Consequently the patent and periodical literature on the subject suggests the use of the partially dehydrated aluminum hydrates in catalysts intended for the dehydrogenation of mono-olefin hydrocarbons. This literature teaches furthermore, as we have seen above, that water vapor should be excluded from the presence of such catalysts. Catalysts comprising a major proportion of Alfrax in combination with a minor proportion of chromium oxide are superior in structural strength and stability to similar catalysts comprising partially dehydrated aluminum hydrate as the alumina ingredient. We have now discovered that such catalysts comprising Alfrax are at least equal in activity to the catalysts comprising partially dehydrated aluminum hydrate or other catalysts which are employed for the dehydrogenation of mono-olefins, such as a catalyst comprising a major proportion of magnesium oxide and minor proportions of the oxides of iron and copper. The chromium oxide-Alfrax catalyst is superior to the catalyst comprising the oxides of magnesium, iron and copper in stability, mechanical ruggedness and ease of manufacture.

Our invention will be described in more detail by reference to specific catalyst preparations and tests thereof. While reference is made principally to catalysts comprising chromium oxide as the activating ingredients and various forms of alumina as the base material it is to be understood that the invention is not limited to such specific materials but includes the dehydrogenation of mono-olefins to di-olefins in the presence of a steam diluent, by means of any composite catalyst comprising an oxide of a metal of the left-hand columns of groups IV, V and VI of the periodic table in combination with a suitable base material or any composite catalyst comprising alumina in combination with an activating material. The invention also includes the use of a composite catalyst comprising alpha $Al_2O_3$ in combination with an activating material, in the presence, or absence, of a diluent.

*Catalyst A.*—500 grams of "Alorco activated alumina" in granular form were dried at 110° C. for 15 hours. An aqueous solution formed by dissolving 83 grams of ammonium dichromate in 250 cc. of water was uniformly distributed over the surface of the alumina. The alumina was contained in an evaporating dish, kept hot by a hot plate and was carefully stirred during the addition of the ammonium dichromate solution to insure homogeneous distribution of the liquid on the support. The material was then heated for 24 hours on the hot plate at a temperature of 200 during which time it changed from light yellow to dark brown with occasional black spots. Catalyst A had been prepared several years prior to its use in this process.

*Catalyst B.*—This catalyst was prepared a short time prior to its use, in the dehydrogenation of butene, by exactly the method described for catalyst A.

*Catalyst C.*—This catalyst was a portion of catalyst B which was subjected to continuous steam treatment for one week at 630° C.

*Catalyst D.*—Alfrax in the form of large pellets was crushed in a mortar. The crushed material was screened and that which passed an 8 mesh sieve and was retained on a 16 mesh sieve was taken for use in the preparation of the catalyst. This granular material was combined with chromium oxide in the manner described above in the preparation of catalyst A.

*Catalyst E.*—This catalyst was prepared exactly like catalyst D except that an amount of the ammonium dichromate solution was adsorbed on the Alfrax to produce in the finished catalyst 20% chromium oxide, instead of 10% as in the catalyst described above.

*Catalyst F.*—This was a specimen of catalyst employed commercially in the dehydrogenation of butene to butadiene. It comprised a major proportion of magnesium oxide in combination with minor proportions of iron oxide and copper oxide.

*Catalyst G.*—This catalyst was prepared exactly like catalyst D except that crushed unglazed porcelain tile of the same mesh size was substituted for the Alfrax.

Catalyst A was employed in a series of operating runs with intermittent regeneration treatment in the dehydrogenation of the 2-butene to butadiene. The results obtained are described in terms of conversion rate, which is the per cent of the butene converted to butadiene. As an example, if in the treatment of 100 parts of butene 50 parts thereof are consumed, and butadiene equivalent to 25 parts of butene is produced, the conversion rate is 25 per cent.

In the first operating run on catalyst A nitrogen at a temperature of 800° C. was mixed with vaporized 2-butene in a proportion of 7 volumes of nitrogen to 1 volume of butene The resulting mixture, at a temperature of 630° C., was passed through a catalyst zone containing catalyst A at a space velocity of 300 volumes of the butent per volume of catalyst space per hour. After 0.7 of an hour of this operating run the conversion rate was approximately 21%. At 1 hour the conversion rate was approximately 19%. Thereafter the first operating run was terminated. The catalyst was regenerated by the passage of air thereover for 4 hours, following which the catalyst zone was flushed with nitrogen. The second operating run was then performed under the same conditions as the first operating run. At the end of ½ hour of this run the conversion rate was 18%; at 1 hour it was 15% and at 3 hours it was 9.3%. Thereafter this operating run was terminated. The catalyst was regenerated by the passage of air thereover for 18 hours after which the catalyst zone was flushed with nitrogen.

In the third operating run employing catalyst A the mixture of nitrogen and 2-butene was passed over the catalyst at the same conditions as in the previous operating runs. At the end of ½ hour of this run the conversion rate was 20%; at 2 hours it was 24%; at 2.5 hours it was 25%; at 7 hours it was 15%, and at 19 hours it was 9%. Thereafter the run was terminated and the catalyst was regenerated by the passage of air thereover for 22 hours, after which the catalyst chamber was flushed with nitrogen.

In the fourth operating run on catalyst A steam was substituted for nitrogen but conditions were otherwise exactly as in previous operating runs. In this run at 1.5 hours the conversion rate was 16%; at 3.0 hours it was 19%; at 3.5 hours it was 22%; at 4.5 hours it was 19.5%; at 5 hours it was 18.3%, and at 23.5 hours it was 15%. Thereafter the run was terminated. The catalyst was regenerated by the passage of air thereover for 24 hours, after which the catalyst chamber was flushed with nitrogen. In this operating run in which steam was employed as the diluent the maximum conversion rate obtained was substantially equal to that obtained in the runs employing nitrogen as a diluent and the level of activity was maintained for a longer time than in any of the runs employing nitrogen as a diluent.

In the next operating run employing catalyst A the conditions were the same as in the previous run except that nitrogen was again employed as a diluent. In this run after ¾ of an hour the conversion rate was 20%; at 1.25 hours it was 22%; at 2 hours it was 21%; at 5 hours it was 17%, and at 6 hours it was 15%. Thereafter the run was terminated. The results of this run indicate that the catalyst was not injured in any manner by the use of steam as a diluent in the preceding run, as the results obtained were comparable to the results obtained in the previous runs employing nitrogen as a diluent.

Catalyst B was tested in an operating run in which nitrogen was used as the diluent and then in a run in which steam was substituted for the nitrogen. In the first of these runs the conditions were exactly as in previous runs employing catalyst A with nitrogen as the diluent. After ½ hour of this run the conversion rate was 23%; at 1 hour it was 24%, and at 2 hours it was 24%. Thereafter the run was terminated and the catalyst was regenerated by the passage of air thereover for 15 hours, following which the catalyst chamber was flushed with nitrogen. In the next operating run on catalyst B steam was substituted for nitrogen and the feed mixture consisted of 7 parts of steam and 2 parts of 2-butene (instead of 1 part of 2-butene as in previous runs). In this run, therefore, the space velocity of the butene was twice as high as in previous runs. In this run after ½ an hour the conversion rate was 11.6%, and at 1 hour it was 13.5%. Thereafter the run was terminated. In this run the rate of production of butadiene was approximately the same as in the previous run operated at lower space velocity.

Catalyst C, which was the catalyst which was subjected to steam treatment for one week, was employed first in an operating run in which nitrogen was employed as a diluent and then in a similar run employing steam as the diluent. In these runs a feed consisting of 7 parts by volume of the diluent and 1 part of 2-butene were passed through the catalyst zone at a space velocity of 300 volumes of butene per catalyst volume per hour, as in the first operating run described above. After ½ hour of the first operating run on catalyst C, employing nitrogen as the diluent, the conversion rate was 20% and at 1.5 hours it was about 20%.

These results demonstrate that the catalyst was not injured by the preliminary steam treatment. The catalyst was regenerated by the passage of air thereover for 23 hours, after which the reaction chamber was flushed with nitrogen. In the next operating run on this catalyst steam was employed as the diluent. After 1.5 hours the conversion rate was 23%; at 2 hours it was 24%; at 8.5 hours it was 16%, and at 14 hours it was 16%. Thereafter the run was terminated. This run demonstrated that the rate of conversion when employing steam as the diluent was at least as high as that obtained in the previous run employing nitrogen as the diluent. The use of steam as the diluent did not, therefore, affect the activity of the catalyst.

When passing a mixture of 7 parts of steam and 1 part of 2-butene through the reaction zone at the same rate as in the previous operating run but in the absence of catalyst the 2-butene was decomposed after 2 hours at a rate of about 25% but no butadiene was produced.

Catalyst D was tested in two successive operating runs involving the dehydrogenation treatment of a mixture of 1 part of 2-butene and 7 parts of steam at a temperature of 630° C. and at a space velocity of 270 volumes of the butene per volume of catalyst space per hour. Catalyst B under these conditions of operation exhibited a conversion rate about two-thirds of that exhibited by that catalyst in the test runs described previously. In the first operating run on catalyst D the conversion rate, after ½ hour of the run, was 16%; at 1 hour it was 16%; at 2 hours it was between 14% and 15%. Thereafter the run was terminated. In this run the conversion rate of 16% was achieved at an efficiency of 62%, the latter being the per cent of butene consumed which is represented by the butadiene product. After regeneration of catalyst D by the passage of air thereover for 20 hours and the usual nitrogen flush a second operating run under the same conditions was made. In this run after ½ hour the conversion rate was 17% and at 1 hour it was still 17%.

In comparative runs on catalyst F the latter achieved after ½ hour of the first run a conversion rate of 17% which was maintained at 1 hour of this run. After regeneration this catalyst exhibited in the second operating run under the same conditions a conversion rate of 15% at ½ hour which was maintained at 1 hour.

The above comparison of catalyst D with catalyst F indicates that under similar conditions they achieve the same rates of conversion of butene to butadiene. The comparison of efficiencies, however, shows a considerable advantage for catalyst D. This is indicated by the fact that in the operating runs on catalyst D the gas production was slightly more than half that of the runs employing catalyst F. The larger quantity of gas produced at the same conversion rate indicates that substantially more cracking occurred in the runs employing catalyst F. This is reflected by the efficiencies of these runs. In the first run employing catalyst D 62% of the butene converted was recovered as butadiene whereas in the second run employing catalyst F only 27% of the butene converted was recovered as butadiene. This indicates an ultimate yield of butadiene by catalyst D about twice that attainable by the use of catalyst F.

The superiority of the $Cr_2O_3$-Alfrax catalyst is further demonstrated by a comparison of catalyst E with a fresh specimen of catalyst F. In these operating runs catalysts E and F were tested under the same conditions as the above described tests of catalyst D with the exception that the space velocities were approximately twice as great. Catalyst E was regenerated from a previous run, in which it exhibited the same properties as catalyst D, by the passage of air thereover for 3 hours, followed by the usual nitrogen flush. In the second test run on catalyst E it achieved during the first hour of the run a conversion rate of about 18%. In the comparative operating run on catalyst F the same conversion rate was reached during the first hour but with a gas production rate about one-third higher. This indicated a lower efficiency for catalyst F. After 1½ hours of the operating run on catalyst E the conversion rate was 15%. At the same time in the operating run on catalyst F the conversion rate was 13% while the gas production rate was slightly higher. At the end of 2 hours of the operating run on catalyst E the conversion rate was 16%. The corresponding figure for catalyst F was 13% with a higher gas production rate.

Catalyst G was tested in an operating run involving the dehydrogenation treatment of a mixture of 1 part of 2-butene and 7 parts of steam at a temperature of 630° C. and at a space velocity of 270 volumes of butene per volume of catalyst space per hour. After ½ hour the conversion rate was 12% and at 1 hour it was 13%. The gas production was slightly more than half that exhibited by catalyst F. Catalyst G appeared to be substantially as active as catalyst F in the conversion of 2-butene to butadiene under conditions at which catalyst G is substantially more efficient.

The foregoing examples demonstrate the application of the invention to the dehydrogenation of 2-butene to butadiene. Necessarily the specific operating conditions employed above do not apply in all applications of the invention to the various mono-olefins and mixtures including one or more mono-olefins which may be treated for the production of di-olefins. In general the operation is carried out at temperatures in the range of 500 to 800° C. Pressures ordinarily should be low in order to facilitate the dehydrogenation reaction, pressures higher than 100 pounds per square inch being undesirable ordinarily. Preferably the pressure should be sub-atmospheric.

The use of a diluent, which is an important feature of this process, permits maintaining a low partial pressure on the hydrocarbon reactants. Steam is preferred as the diluent because it may be employed as a regenerating medium and because of its relative cheapness, availability and ease of handling. If desired mixtures of steam and other inert diluents, such as carbon di-oxide, nitrogen and methane, may be employed. Ordinarily the ratio of diluent to hydrocarbon reactants in the feed mixture should be as high as is consistent with economical operation of the apparatus. It will be found ordinarily that the most efficient ratios of hydrocarbon reactants are in the range of 1 to 25 mols of diluents per mol of hydrocarbon reactants.

The time of contact should be controlled carefully to obtain the maximum conversion of the mono-olefin to the desired di-olefin at acceptable efficiencies. Since economic factors enter into this consideration the selection of the rate at which the reaction mixture is passed through the catalyst zone must be determined for each condition of operation in relation to the economic factors involved. It should be pointed out, however, that for each condition of operation there is a practical maximum conversion rate which cannot be increased by increasing the contact time since such increase of contact time increases the rate of decomposition as much or more than it increases the rate of formation of the di-olefin product. For example, the employment of catalyst B in the dehydrogenation of 2-butene under the conditions last described above but at a substantially lower space velocity resulted in substantial decomposition of the 2-butene but little or no production of butadiene.

We claim:

1. The method of converting mono-olefins to di-olefins which comprises contacting said mono-olefins at elevated temperature with a solid granular catalyst comprising a major proportion of alumina having deposited on the surfaces thereof a minor proportion of an oxide of a metal of the left-hand columns of groups IV, V and VI of the periodic table in a substantially non-oxidizing atmosphere containing at least one mol of steam per mol of mono-olefin reactants.

2. The method of converting mono-olefins to di-olefins which comprises contacting said mono-olefins at elevated temperature with a solid granular catalyst comprising a major proportion of alpha alumina having deposited on the surfaces thereof a minor proportion of an oxide of a metal of the left-hand columns of groups IV, V and VI of the periodic table in a substantially non-oxidizing atmosphere containing at least one mol of steam per mol of mono-olefin reactants.

3. The method of converting mono-olefins to di-olefins which comprises contacting said mono-olefins at elevated temperature with a solid granular catalyst comprising a major proportion of alumina having deposited on the surfaces thereof a minor proportion of an oxide of a metal of the left-hand column of group VI of the periodic table in a substantially non-oxidizing atmosphere containing at least one mol of steam per mol of mono-olefin reactants.

4. The method of converting mono-olefins to di-olefins which comprises contacting said mono-olefins at elevated temperature with a solid granular catalyst comprising a major proportion of alumina having deposited on the surfaces thereof a minor proportion of chromium oxide in a substantially non-oxidizing atmosphere containing at least one mol of steam per mol of mono-olefin reactants.

5. The method of converting butene to butadiene which comprises contacting butene at elevated temperature with a solid granular catalyst comprising a major proportion of alumina having deposited on the surfaces thereof a minor proportion of an oxide of a metal of the left-hand columns of groups IV, V and VI of the periodic table in a substantially non-oxidizing atmosphere containing at least one mol of steam per mol of butene.

6. The method of converting butene to butadiene which comprises contacting butene at elevated temperature with a solid granular catalyst comprising a major proportion of alumina having deposited on the surfaces thereof a minor proportion of an oxide of a metal of the left-hand column of group VI of the periodic table in a substantially non-oxidizing atmosphere containing at least one mol of steam per mol of butene.

7. The method of converting butene to butadiene which comprises contacting butene at elevated temperature with a solid granular catalyst comprising a major proportion of alumina having deposited on the surfaces thereof a minor proportion of chromium oxide in a substantially non-oxidizing atmosphere containing at least one mol of steam per mol of butene.

HUGH S. TAYLOR.
JOHN TURKEVICH.